United States Patent
Nishiwaki et al.

(10) Patent No.: US 9,870,774 B2
(45) Date of Patent: Jan. 16, 2018

(54) VEHICULAR APPARATUS AND SPEECH SWITCHOVER CONTROL PROGRAM

(71) Applicant: DENSO CORPORATION, Kariya, Aichi-pref. (JP)

(72) Inventors: Takayuki Nishiwaki, Kariya (JP); Takahiro Enomoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/916,593

(22) PCT Filed: Aug. 25, 2014

(86) PCT No.: PCT/JP2014/004352
§ 371 (c)(1),
(2) Date: Mar. 4, 2016

(87) PCT Pub. No.: WO2015/033529
PCT Pub. Date: Mar. 12, 2015

(65) Prior Publication Data
US 2016/0196824 A1    Jul. 7, 2016

(30) Foreign Application Priority Data

Sep. 5, 2013  (JP) .................................. 2013-183978

(51) Int. Cl.
*G10L 19/00* (2013.01)
*G10L 15/20* (2006.01)
(Continued)

(52) U.S. Cl.
CPC ........... *G10L 15/28* (2013.01); *H04M 1/6091* (2013.01); *H04M 2250/02* (2013.01)

(58) Field of Classification Search
CPC .......... G10L 19/00; G10L 15/20; G10L 21/00
(Continued)

(56) References Cited

U.S. PATENT DOCUMENTS

| 4,837,830 A | * | 6/1989 | Wrench, Jr. ............. G10L 17/00 704/238 |
| 5,371,901 A | * | 12/1994 | Reed ..................... H04M 1/725 455/11.1 |

(Continued)

FOREIGN PATENT DOCUMENTS

| JP | 2000322083 A | 11/2000 | |
| JP | 2005114521 A | * 4/2005 | ............. B60R 16/02 |

(Continued)

OTHER PUBLICATIONS

International Search Report and Written Opinion (in Japanese with English Translation) for PCT/JP2014/004352, dated Oct. 28, 2014; ISA/JP.

*Primary Examiner* — Seong Ah A Shin
(74) *Attorney, Agent, or Firm* — Harness, Dickey & Pierce, P.L.C.

(57) ABSTRACT

A vehicular apparatus is provided. In the vehicular apparatus, a first controller is disposed on a first board and a second controller is disposed on a second board which is exchangeable with respect to the first board. An AD converter performs A/D conversion of first and second speech data. A switch disposed on the first board is switchable between a first connection state in which the switch outputs the first speech data inputted from the A/D converter and a second connection state in which the switch outputs a sound data different from each of the first and second speech data. A switch controller controls the switch so that the switch is in the second connection state when the second controller performs speech recognition of the second speech data.

7 Claims, 3 Drawing Sheets

(51) Int. Cl.
*G10L 21/00* (2013.01)
*G10L 15/28* (2013.01)
*H04M 1/60* (2006.01)

(58) Field of Classification Search
USPC .................. 704/233, 238, 246, 275, 201
See application file for complete search history.

(56) References Cited

U.S. PATENT DOCUMENTS

| | | | |
|---|---|---|---|
| 6,219,645 B1* | 4/2001 | Byers | G10L 15/02 |
| | | | 381/91 |
| 7,016,836 B1* | 3/2006 | Yoda | G10L 15/20 |
| | | | 455/563 |
| 7,085,710 B1 | 8/2006 | Beckert et al. | |
| 8,165,886 B1* | 4/2012 | Gagnon | G10L 15/19 |
| | | | 704/275 |
| 2005/0159945 A1* | 7/2005 | Otsuka | G01C 21/3608 |
| | | | 704/226 |
| 2005/0209719 A1 | 9/2005 | Beckert et al. | |
| 2005/0209852 A1 | 9/2005 | Beckert et al. | |
| 2005/0209858 A1* | 9/2005 | Zak | H04W 76/005 |
| | | | 704/275 |
| 2007/0055531 A1* | 3/2007 | Nada | G10L 15/28 |
| | | | 704/275 |
| 2009/0164212 A1* | 6/2009 | Chan | G10L 21/0208 |
| | | | 704/226 |
| 2009/0228615 A1 | 9/2009 | Beckert et al. | |
| 2011/0173002 A1* | 7/2011 | Fujii | G10L 15/26 |
| | | | 704/246 |
| 2013/0337762 A1* | 12/2013 | Buch | G08G 1/205 |
| | | | 455/404.1 |
| 2015/0039303 A1* | 2/2015 | Lesso | G10L 15/28 |
| | | | 704/233 |

FOREIGN PATENT DOCUMENTS

| | | | |
|---|---|---|---|
| JP | 2005114521 A | * | 4/2005 |
| JP | 2007226793 A | | 9/2007 |
| JP | 2009298405 A | | 12/2009 |

\* cited by examiner

NO GENERATION OF IS2 CLOCK WAVEFORM ROUNDING

GENERATION OF IS2 CLOCK WAVEFORM ROUNDING

GENERATION OF IS2 CLOCK WAVEFORM ROUNDING

VEHICULAR APPARATUS AND SPEECH SWITCHOVER CONTROL PROGRAM

CROSS REFERENCE TO RELATED APPLICATIONS

This application is a U.S. National Phase Application under 35 U.S.C. 371 of International Application No. PCT/JP2014/004352 filed on Aug. 25, 2014 and published in Japanese as WO 2015/033529 A1 on Mar. 12, 2015. This application is based on and claims the benefit of priority from Japanese Patent Application No. 2013-183978 filed on Sep. 5, 2013. The entire disclosures of all of the above applications are incorporated herein by reference.

TECHNICAL FIELD

The present disclosure relates to a vehicular apparatus mounted to a vehicle and a speech switchover control program.

BACKGROUND ART

A vehicular apparatus mounted to a vehicle is required to be developed in a short time in view of rapid progress of a portable information terminal, which is connected to the vehicular apparatus by a short range communication such as Bluetooth (registered trademark) and the like. Under this circumstance, it is conceived that a first control means dedicated to control of a vehicle system such as navigation and the like and a second control means dedicated to control of an information system such as HMI (Human Machine Interface) and the like are mounted to different boards. In this structure, the first control means is mounted to the first board and the second control means is mounted to the second board, and card-edge connection is made between the first board and the second board, so that the second board can easily be exchanged with respect to the first board and an apparatus function addition (update) can be easily made. Incidentally, a vehicular apparatus for performing speech recognition of speech data uttered by a user is provided (see Patent Literature 1 for example).

The inventors of the present application have recognized the following.

When the first controller and the second controller are mounted to different boards, a conceivable structure is that the first controller performs speech processing on a first speech data not targeted for the speech recognition and the second controller performs speech processing on a second speech data targeted for the speech recognition. In that regard, when a common A/D converter for performing A/D conversion of each of the first speech data and the second speech data is employed in order to reduce the number of parts, a resultant conceivable structure is that the A/D converter is connected to the first controller and the second controller by a signal line compliant with Inter-IC Sound (I2S) standards. In this structure, the first speech data and the second speech data are transmitted via different channels (L channel and R channel) and the I2S speech data outputted from the A/D converter is branched.

However, the structure with the branch of the I2S speech data outputted from the A/D converter involves the following conceivable difficulties. When a switch provided on an upstream side of the first controller in a signal flow direction switches over between a first connection state in which the first speech data is inputted to the first controller and a second connection state in which different speech data other than the first speech data and the second speech data is inputted to the first speech controller, the path of the I2S speech data in the second connection state is cut at the switch but the path of the I2S speech data in the first connection state is extended to the first controller via the switch. That is, a branch pattern (open stub) is extended by a path that connects between the switch and the first controller.

When the branch pattern is extended from the branch point, I2S clock waveform may be rounded. When the I2S clock waveform is rounded in the speech recognition of the second speech data, a bit deviation may occur due to chattering. Accordingly, the second speech data cannot be accurately determined (retrieved) and as a result, the speech recognition cannot be accurately performed.

PRIOR ART LITERATURES

Patent Literature

Patent Literature 1: JP2009-298405A

SUMMARY OF INVENTION

The present disclosure is made in view of the foregoing circumstances. It is an object to provide a vehicular apparatus and a speech switchover control program that can facilitate a device function addition and reduce the number of parts while appropriately performing speech recognition of speech data.

A vehicular apparatus in an example of the present disclosure comprises an A/D converter, a switch, a first controller, an input output part, a second controller, a signal line, and a switch controller. The A/D converter, the switch, the first controller are disposed on the first board. The performs A/D conversion of a first speech data and a second speech data and outputs it, wherein the first speech data is a speech data not targeted for speech recognition, and the second speech data is a speech data targeted for speech recognition. The switch is switchable between a first connection state in which the switch outputs the first speech data inputted from the A/D converter and a second connection state in which the switch outputs a sound data different from each of the first speech data and the second speech data. The first controller performs speech processing on each of the first speech data or the second speech data inputted from the switch.

The input output part and the second controller are disposed on a second board which is exchangeable with respect to the first board. The input output part outputs the second speech data inputted from the A/D converter. The second controller has a function to perform speech recognition of the second speech data inputted from the input output part. The signal line is compliant with Inter-IC sound standards and is disposed extending over the first board and the second board. With a first channel of the signal line, the first speech data outputted from the A/D converter is transmitted and inputted to the first controller via the switch. With a second channel of the signal line, the second speech data outputted from the A/D converter is transmitted and inputted to the second controller via the input output part. The switch controller controls the switch so that the switch is in the second connection state when the second controller performs the speech recognition of the second speech data.

Accordingly, because the second board provided with the second controller is exchangeable with respect to the first board provided with the first controller, a device function adding can be easily made. Furthermore, because a common A/D converter for performing A/D conversion of both of the first speech data and the second speech data is employed, the number of parts can be reduced. Furthermore, because the switch is controlled to be in the second connection state when the second controller performs the speech recognition of the second speech data, the path of the speech data of the Inter-IC sound can be cut at the switch. As a result, generation of the rounding of a clock waveform of the Inter-IC sound can be avoided and a determination (retrieval) of the second speech data can be accurately made. The speech recognition of the second speech data can be appropriately performed.

A speech switchover control program in an example of the present disclosure is applied to a computer of a vehicular apparatus. The comprises an A/D converter that is disposed on a first board and performs A/D conversion of a first speech data and a second speech data and outputs it, wherein the first speech data is a speech data not targeted for speech recognition, and the second speech data is a speech data targeted for speech recognition; a switch that is disposed on the first board and switchable between a first connection state in which the switch outputs the first speech data inputted from the A/D converter and a second connection state in which the switch outputs a sound data different from the first speech data and the second speech data; a first controller that is disposed on the first board and performs speech processing on each of the first speech data or the second speech data inputted from the switch; an input output part that is disposed on an exchangeable second board with respect to the first board and outputs the second speech data inputted from the A/D converter; a second controller that is disposed on the second board and has a function to perform speech recognition of the second speech data inputted from the input output part; and a signal line that is compliant with inter-IC sound standards and disposed extending over the first board and the second board, wherein with a first channel of the signal line, the first speech data outputted from the A/D converter is transmitted and inputted to the first controller via the switch, wherein with a second channel of the signal line, the second speech data outputted from the A/D converter is transmitted and inputted to the second controller via the input output part. The speech switchover control program causes the computer of the vehicular apparatus to perform: a first step of determining whether or not the second controller is to perform the speech recognition of the second speech data; and a second step of, when it is determined in the first step that the second controller is to perform the speech recognition of the second speech data, controlling the switch so that the switch is in the second connection state. This speech switchover control program may be provided by being stored in a non-transitory computer readable storage medium and may be provided via communication networks.

This speech switchover control program can achieve the same technical advantages as the above vehicular apparatus.

EMBODIMENTS FOR CARRYING OUT INVENTION

Figure 1:
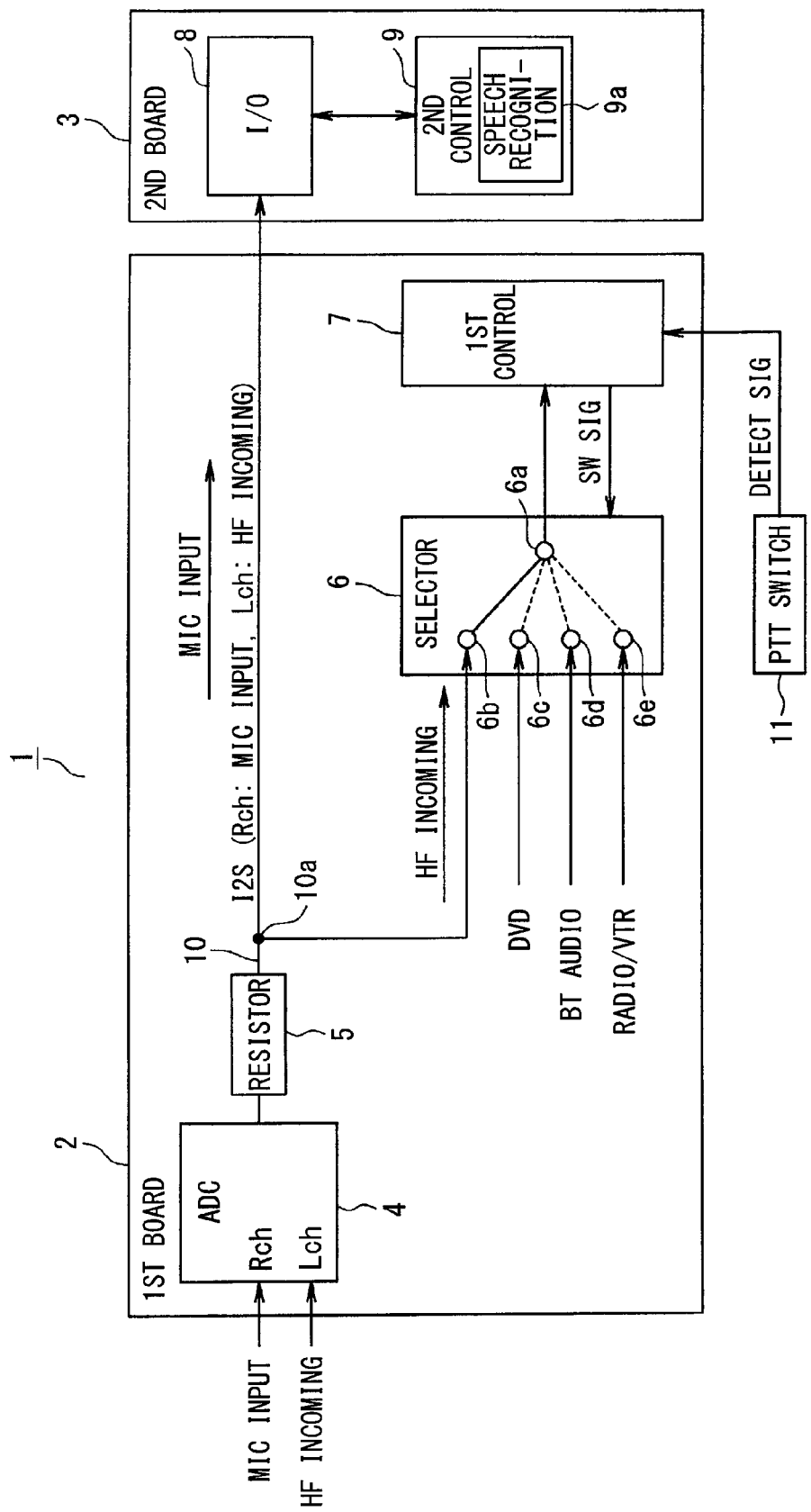
FIG. 1 is a functional block diagram showing an embodiment of the present disclosure.

Embodiments of the present disclosure will be described with reference to the drawings. A vehicular apparatus 1 has a Bluetooth (registered trademark) (referred to hereinafter as BT) communication function and is configured to be capable of connecting a handsfree profile (HFP) by connecting a BT communication line with a BT communication device (for example, portable information terminal etc.). With the handsfree profile connected with the BT communication device, the vehicular apparatus 1 inputs a speech data transmitted from a call partner of the hands-free call as a handsfree incoming-speech data (HF incoming-speech data, first speech data). Via a speech signal line, the vehicular apparatus 1 is connected to a microphone (not shown) arranged at predetermined position (e.g., around a steering wheel) in a vehicle cabin and inputs a speech data of speech collected by the microphone as a microphone input-speech data (second speech data) via a speech signal line.

The vehicular apparatus 1 includes a first board 2 and a second board 3. An A/D converter (ADC) 4, a resistor 5, a selector 6, and a first controller 7 are mounted on the first board 2. An input output part 8 and a second controller 9 are mounted on the second board 3. The A/D converter is an embodiment of an A/D converter and an A/D conversion means. The selector 6 is an embodiment of a switch and a switching means. The first controller 7 is an embodiment of first control means, a switch controller and a switch control means. The input output part 8 is an embodiment of an input/output means. The second controller 9 is an embodiment of a second control means. The first board 2 and the second board 3 have a structure to have card-edge connection. The second board 3 is exchangeable with respect to the first board 2. The A/D converter 4 is connected to a signal line compliant with Inter-IC Sound (I2S) standards. The signal line 10 extends over the first board 2 and the second board 3 and has a branch at a branch point 10a in the first board 2. A line after the branch is connected to the first controller 7 via the selector 6. Another line after the branch is connected to the second controller 9 via the input output part 8.

When the handsfree incoming-speech data and the microphone input-speech data are inputted, the A/D converter 4 converts the inputted speech data from an analog signal into a digital signal and outputs it. The speech data outputted from the A/D converter 4 is transmitted in the signal line 10, flows via the resistor 5 and branches at the branch point 10a, and is inputted to the selector 6, and is transmitted from the first board 2 to the second board 3 and inputted to the input output part 8. The handsfree incoming-speech data is transmitted with an L channel (first speech channel) and the microphone input-speech data is transmitted with an R channel (second speech channel).

The selector 6 includes a movable contact 6a and first to fourth fixed contacts 6b to 6e and selectively connects the movable contact 6a to any of the first to fourth fixed contacts 6b to 6e to switch over a connection state. The first fixed contact 6b is connected to the signal line 10, which is compliant with the above-mentioned I2S standards. The second fixed contact 6c is connected to a signal line for transmitting DVD sound data. The third fixed contact 6d is connected to a signal line for transmitting BT audio data. The fourth fixed contact 6e is connected to a signal line for transmitting a radio/VTR sound data. These DVD sound data, the BT audio data and the radio/VTR sound data are different from any of the first speech data and the second speech data.

In the selector 6, a first connection state is a state in which the movable contact 6a is connected to the fixed contact 6b. A second connection state is a state in which the movable contact 6a is connected to the fixed contact 6c, the movable contact 6a is connected to the fixed contact 6d, or the movable contact 6a is connected to the fixed contact 6e. When the selector 6 is in the second connection state (states shown by the broken lines in FIG. 1), a path of the I2S speech data from the branch point 10a is cut at the selector 6. When the selector 6 is in the first connection state (state shown by the solid lines in FIG. 1), a path of the I2S speech data from the branch point 10a is extended to the first controller 7 via the selector 6. Specifically, a branch pattern (open stub) from the branch point 10a is extended by a path connecting the selector 6 to the first controller 7.

The first controller 7 is provided with a known microcomputer including a CPU (Central Processing Unit), a RAM (Random Access Memory), a ROM (Read Only Memory), I/O (Input/Output) bus and the like. The first controller 7 executes control programs including a speech switchover control program stored in the ROM or the like, and performs data processing of a vehicle system such as navigation and the like. The first controller 7 functions as a custom core. The first controller 7 is connected to a PTT (Push to Talk) switch 11, which is manipulatable by a user such as a vehicle occupant (driver etc.). The PTT switch 11 is, for example, part of steering switches provided in the steering wheel. Based on an input of a detection signal from the PTT switch 11, the first controller 7 detects user's operation of the PTT switch 11. In the present embodiment, the detection signal from the PTT switch 11 is directly inputted to the first controller 7. Alternatively, the detection signal from the PTT switch 11 may be inputted to the first controller 7 via another microcomputer. The first controller 7 outputs a switch signal to the selector 6 to switch over the connection state of the selector 6. For example, the switch signal is a 2 bit signal and the switch signal which can have four combinations is outputted from the first controller 7 to the selector 6.

The second controller 9 is provided with a known microcomputer including a CPU, a RAM, a ROM, an I/O bus and the like. The second controller 9 executes control programs stored in the ROM or the like and performs data processing of an information system such as HMI (Human Machine Interface) and the like. The second controller 9 functions as a general-purpose core, whereas the first controller 7 functions as the custom core. The second controller 9 includes a speech recognition module 9a for performing speech recognition of speech data.

Operations in the above-structure will be described with reference to FIG. 2, FIG. 3A, FIG. 3B and FIG. 3C.

Figure 2:
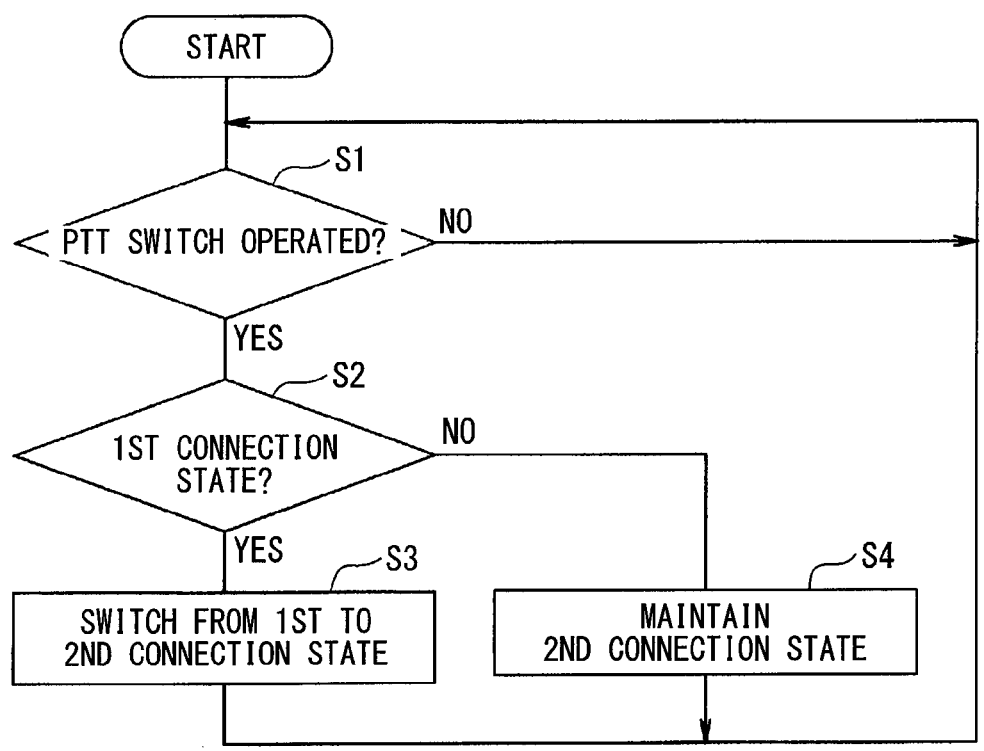
FIG. 2 is a flowchart showing processes performed by a first controller.

The first controller 7 performs processes that are illustrated in FIG. 2 as a flow chart. The first controller 7 monitors whether or not the detection signal is inputted from the PTT switch 11, thereby monitoring whether or not the PTT switch 11 is manipulated by a user (S1, first step). For example, when a user intends to set a destination or sets play music using a speech recognition function, the user first manipulates the PTT switch 11 to start up the speech recognition function. When determining the input of the detection signal from the PTT switch 11 and the user's manipulation of the PTT switch 11 (YES at S1), the first controller 7 determines whether or not the selector 6 is in the first connection state at this time (S2).

When determining that the selector 6 is in the first connection state at the time of the input of the detection signal from the PTT switch 11 (YES at S2), the first controller 7 outputs the switch signal to the selector 6 and switches over the selector 6 from the first connection state to the second connection state (S3, second step). In this case, the first controller 7 may switch over (return) it into a connection state (a specific connection state) that was used immediately before the switching over from the second connection state to the first connection state or may switch over it into a preset connection state (a specific connection state). The preset connection state, which is a target connection state in the switching over, may be user-settable or may be fixed by a manufacture. After completing the switching over of the selector 6 from the first connection state to the second connection state, the first controller 7 notifies the user that the speech recognition is available (speech is inputtable), by for example speech output from a speaker (not shown).

When determining that the selector 6 is not in the first connection state (is in the second connection state) at the time of the input of the detection signal from the PTT switch 11 (NO at S2), the first controller 7 maintains the second connection state of the selector 6 (S4). In this case, after completing confirmation of the second connection state of the selector 6, the first controller 7 notifies the user that the speech recognition is available.

Figure 3A:
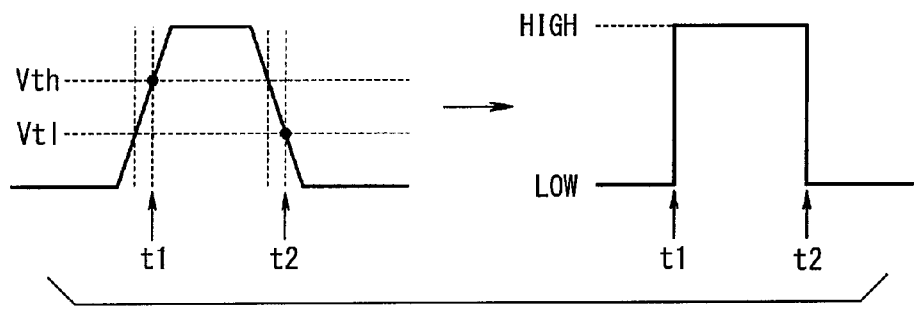
FIG. 3A is a diagram showing an example of I2S clock waveform when no rounding of the clock waveform is generated.
Figure 3B:
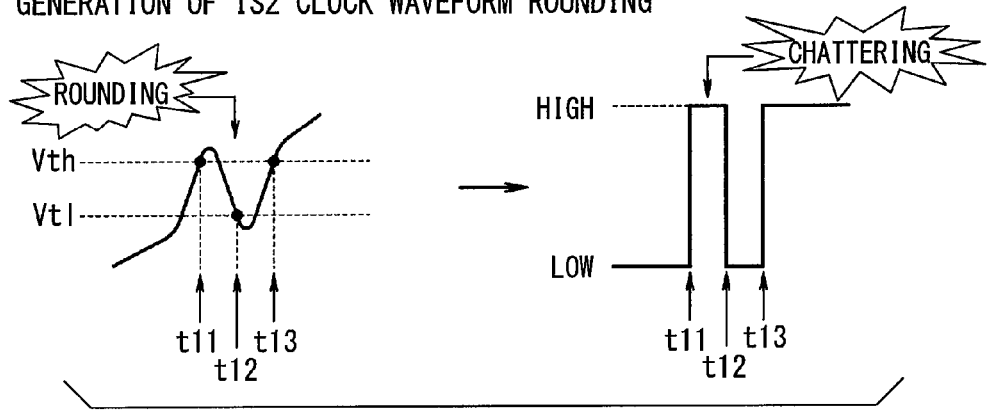
FIG. 3B is a diagram showing an example of I2S clock waveform when rounding of the clock waveform is generated.
Figure 3C:
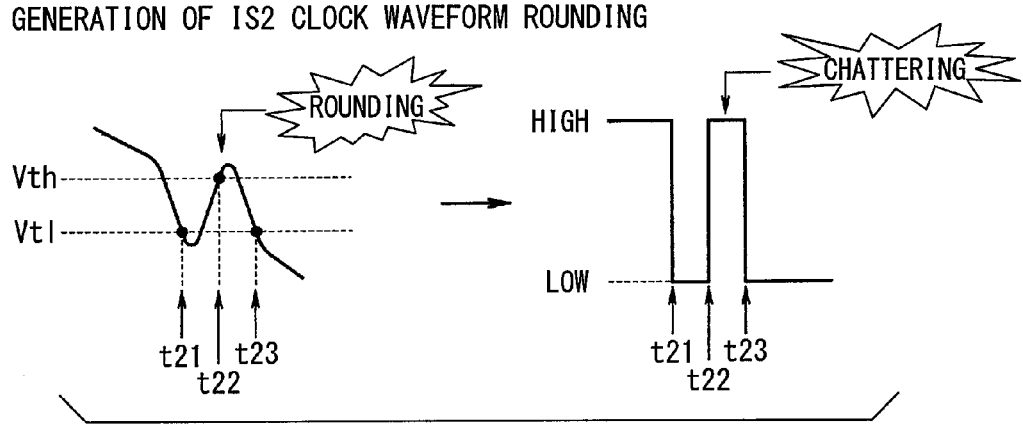
FIG. 3C is a diagram showing another example of I2S clock waveform when rounding of the clock waveform is generated.

By performing the above described series of processes, the first controller 7 performs control so that the selector 6 is in the second connection state when the second controller 9 performs the speech recognition of the microphone input speed data. In this connection, when the selector 6 is in the first connection state and a path of the I2S speech data from the branch point 10a is extended to the first controller 7 via the selector 6, there is a concern that rounding of the I2S clock waveform is generated. Specifically, as shown in FIG. 3A, when no rounding of the I2S clock waveform is generated in the input output part 8 which inputs the I2S clock, a rise edge and a fall edge of the clock signal can be accurately reproduced in accordance with the clock waveform (t1, t2). However, as shown in FIG. 3B and FIG. 3C, when the rounding of the I2S clock waveform is generated and the waveform has up-down changes around high/low thresholds Vth, Vtl, a rise edge and a fall edge of the clock signal cannot be accurately reproduced due to chattering (t11 to t13, t21 to t23). When the rounding of the I2S clock waveform is generated in the speech recognition of the microphone input-speech data, the bit deviation is generated due to the chattering and the determination of the microphone input-speech data cannot be accurately made. In the present embodiment, when the speech recognition of the microphone input-speech data is performed, the selector 6 is controlled to be in the second connection state, specifically, the control is performed so that the branch pattern from the branch point 10a is not extended. In this way, the rounding of the I2S clock waveform is prevented and the speech recognition of the microphone input-speech data is appropriately performed.

In the above-illustrated embodiment, the vehicular apparatus 1 is configured such that the second board 3 mounted with the second controller 9 is exchangeable with respect to the first board 2 mounted with the first controller 7. Therefore, a device function adding can be easily made. Furthermore, because a common A/D converter 4 for performing A/D conversion of both of the handsfree incoming-speech data and the microphone input-speech data is employed, the number of parts can be reduced. Additionally, because the number of parts can be reduced, the flexibility of part layout can be enhanced. Furthermore, because the selector 6 is controlled to be in the second connection state when the second controller 9 performs the speech recognition of the microphone input-speech data, the path of the I2S speech data can be cut at the selector 6. As a result, the generation of the rounding of the I2S clock waveform can be avoided and the determination of the microphone input-speech data can be accurately made. The speech recognition of the microphone input-speech data can be appropriately performed. Additionally, the flexibility of layout of the selector 6 and the first controller 7 can be enhanced.

Furthermore, because the user is notified of the speech recognition availability after the completion of the switching over of the selector 6 from the first connection state to the second connection state, it is possible to reduce a possibility that a user utters the speech before the completion of the switching over of the selector 6 from the first connection state to the second connection state. It is possible to inform the user of a good timing in uttering speech.

The present disclosure is not limited to the above embodiments. Modifications and extensions can be made in the following ways.

The second connection state of the selector 6 may not have all of the connection states, which are the connection state in which the DVD sound data is inputted to the first controller 7, the connection state in which the BT audio data is inputted to the first controller 7, and the connection state in which the radio/VTR sound data is inputted to the first controller 7. The second connection states of the selector 6 may have at least any of the connection states. Specifically, as long as the path of the I2S speech data is cut at the selector 6 when the second controller 9 performs the speech recognition of the microphone input-speech data, any configurations are employable.

Processes of monitoring the input of the handsfree incoming-speech data and switching over the selector 6 from the first connection state to the second connection state after elapse of a predetermined time from completion of the input of the handsfree incoming-speech data may be used in combination.

Although embodiments and configurations according to the present disclosure have been illustrated, embodiments and configurations are not limited to those illustrated above. For example, embodiments and configurations obtained by appropriately combining technical parts disclosed in different embodiments and configurations are also within the scope of embodiments and configurations of to the present disclosure.

What is claimed is:

1. A vehicular apparatus comprising:
   a common A/D converter that is disposed on a first board and performs A/D conversion of a first speech data and a second speech data and outputs the first speech data and the second speech data, wherein the first speech data is a speech data not targeted for speech recognition, and the second speech data is a speech data targeted for speech recognition;
   a switch that is disposed on the first board and switchable between
      a first connection state in which the switch outputs the first speech data inputted from the common A/D converter and
      a second connection state in which the switch outputs a different sound data different from each of the first speech data and the second speech data;
   a first controller that is disposed on the first board and performs speech processing on each of the first speech data or the different sound data inputted from the switch;
   an input output part that is disposed on an exchangeable second board with respect to the first board and outputs the second speech data inputted from the common A/D converter;
   a second controller that is disposed on the second board and has a function to perform speech recognition of the second speech data inputted from the input output part;
   a signal line that is compliant with Inter-IC sound standards and disposed extending over the first board and the second board, wherein
      with a first channel of the signal line, the first speech data outputted from the common A/D converter is transmitted and inputted to the first controller via the switch, and
      with a second channel of the signal line, the second speech data outputted from the common A/D converter is transmitted and inputted to the second controller via the input output part; and
   a switch controller that controls the switch so that the switch is in the second connection state when the second controller performs the speech recognition of the second speech data.

2. The vehicular apparatus according to claim 1, wherein:
   when the switch controller switches over the switch from the first connection state to the second connection state for the second controller to perform the speech recognition of the second speech data, the switch controller notifies speech recognition availability after completing switching over of the switch from the first connection state to the second connection state.

3. The vehicular apparatus according to claim 1, wherein:
   the second connection state of the switch has a plurality of connection states corresponding to the different sound data; and
   when the switch controller switches over the switch from the first connection state to the second connection state for the second controller to perform the speech recognition of the second speech data, the switch controller switches over the switch to a specific connection state, which is one of the plurality of connection states of the second connection state and was used immediately before switching over from the second connection state to the first connection state.

4. The vehicular apparatus according to claim 1, wherein:
   the second connection state of the switch has a plurality of connection states corresponding to the different sound data; and
   when the switch controller switches over the switch from the first connection state to the second connection state for the second controller to perform the speech recognition of the second speech data, the switch controller switches over the switch to a specific connection state, which is a preset one of the plurality of connection states of the second connection state.

5. The vehicular apparatus according to claim 1, wherein the first speech data includes hands free incoming-speech data and the second speech data includes microphone input-speech data.

6. The vehicular apparatus according to claim 1, wherein the different sound data includes one of DVD sound data, Bluetooth audio data, and radio sound data.

7. A non-transitory computer readable storage medium storing a speech switchover control program that causes a computer, which is included in a vehicular apparatus comprising: a common A/D converter that is disposed on a first board and performs A/D conversion of a first speech data and a second speech data and outputs the first speech data and the second speech data, wherein the first speech data is a speech data not targeted for speech recognition, and the second speech data is a speech data targeted for speech recognition; a switch that is disposed on the first board and switchable between a first connection state in which the switch outputs the first speech data inputted from the common A/D converter and a second connection state in which the switch outputs a different sound data different from the first speech data and the second speech data; a first controller that is disposed on the first board and performs speech processing on each of the first speech data or the different sound data inputted from the switch; an input output part that is disposed on an exchangeable second board with respect to the first board and outputs the second speech data inputted from the common A/D converter; a second controller that is disposed on the second board and has a function to perform speech recognition of the second speech data inputted from the input putout part; and a signal line that is compliant with inter-IC sound standards and disposed extending over the first board and the second board, wherein with a first channel of the signal line, the first speech data outputted from the common A/D converter is transmitted and inputted to the first controller via the switch, wherein with a second channel of the signal line, the second speech data outputted from the common A/D converter is transmitted and inputted to the second controller via the input output part, to perform:

determining whether or not the second controller is to perform the speech recognition of the second speech data; and when it is determined that the second controller is to perform the speech recognition of the second speech data, controlling the switch so that the switch is in the second connection state.

* * * * *